United States Patent [19]

Harayama et al.

[11] 4,320,214

[45] Mar. 16, 1982

[54] METHOD OF MAKING SILANE-MODIFIED ETHYLENE-TYPE RESIN

[75] Inventors: Hiroshi Harayama, Kusatsu; Ken Shinkai, Hirakata; Hiroshi Takahashi, Otsu; Masahiro Mizusako, Osaka, all of Japan

[73] Assignee: Sekisui Kagaku Kogyo Kabushiki Kaisha, Osaka, Japan

[21] Appl. No.: 969,589

[22] Filed: Dec. 14, 1978

[30] Foreign Application Priority Data

Dec. 15, 1977 [JP] Japan ................................ 52-151422

[51] Int. Cl.³ .................... C08F 255/00; C08F 255/02
[52] U.S. Cl. ...................................... 525/264; 525/288

[58] Field of Search ................ 260/827; 525/288, 247, 525/264

[56] References Cited

U.S. PATENT DOCUMENTS 3,646,155 2/1972 Scott .................................. 260/827
4,048,129 9/1977 Voigt .................................. 260/827

FOREIGN PATENT DOCUMENTS 2528691 1/1977 Fed. Rep. of Germany ...... 528/288

Primary Examiner—Wilbert J. Briggs, Sr.
Attorney, Agent, or Firm—Russell and Nields

[57] ABSTRACT

Zinc oxide is used during manufacture of silane-modified ethylene-type resin so that the resulting material changes little with the passage of time.

4 Claims, No Drawings

METHOD OF MAKING SILANE-MODIFIED ETHYLENE-TYPE RESIN

BACKGROUND OF THE INVENTION

U.S. Pat. No. 3,646,155 discloses that a silane-modified ethylene-type resin which has been produced by reacting certain silane compounds with an ethylene-type resin (such as polyethylene, a copolymer consisting primarily of ethylene, etc.) in the presence of a free-radical-producing agent can be cross-linked by exposure to water in the presence of a silanol-condensation catalyst. Silane-modified ethylene-type resins obtained by this method can have their cross-link density changed at will, and have excellent properties of heat-resistance, atmosphere-resistance and chemical resistance; as a result, they are used in the manufacture of pipe, electrical insulation, film, etc. and are also ideal in the manufacture of foamed articles.

However, the aforementioned silane-modified ethylene-type resin absorbs moisture from the atmosphere and the cross-linking reaction gradually proceeds, even in the absence of a silanol-condensation catalyst. As a result, the melt index falls and moldability decreases. Because of these defects, it has been necessary to adopt special storage methods in order to suppress the aforementioned change with the passage of time in the case of long-term storage.

SUMMARY OF THE INVENTION

The present inventors, taking note of the aforementioned defects, as a result of earnest investigation, have made the present invention by discovering that changes with the passage of time become small in the case of silane-modified ethylene-type resins which have been produced by adding zinc oxide when the silane compound is reacted with the ethylene-type resin, so that the silane-modified ethylene-type resin is obtained without reducing the rate of graft-formation of the silane compound.

DETAILED DESCRIPTION OF A PREFERRED EMBODIMENT

The gist of the invention resides in a method of making silane-modified ethylene-type resin, characterized in that when the mixture of an alkoxy-silane compound having unsaturated radicals and a free-radical-producing agent with an ethylene-type resin is melt-kneaded, zinc oxide is included in said mixture.

As the ethylene-type resin which is used in this invention, it is possible to use not only polyethylene but also copolymers having ethylene as a principal component, e.g. ethylene vinyl acetate copolymer, ethylene vinyl chloride copolymer, etc. Also, as far as polyethylene is concerned, it is possible to use low density polyethylene as well as high density polyethylene.

Next, as the alkoxy-silane compound having unsaturated radicals which is used in this invention, generally speaking there are included organic silicon compounds which have at least one unsaturated hydrocarbon radical (e.g. something having a vinyl radical or an aryl radical) or at least one hydrocarbon-oxy radical (e.g. having an acryl radical or a methacryl radical) and which have at least two alkoxy radicals (such as methoxy radical, ethoxy radical, butoxy radical, etc.). In particular, silane compounds in which the unsaturated radical is vinyl and in which the alkoxy radical is methoxy or ethoxy are ideal, and as concrete examples one may desirably use vinyl-trimethoxy-silane or vinyl-triethoxy-silane.

As far as the amount of the aforementioned alkoxy-silane compound which is to be used is concerned, if the amount of said ethylene-type resin which is used is 100 parts by weight, then 0.1–30 parts by weight is suitable, and preferably 0.5–10 parts by weight should be used.

Next, as the free-radical-producing agent which is used in this invention, it is a compound which decomposes when heated and produces free radicals, and it is something which is used as an agent to initiate a reaction which chemically bonds the said alkoxy-silane compound having unsaturated radicals to the ethylene-type resin. As said free-radical-producing agent, one which has a half-life of 3 minutes or less at a temperature at or above the melting point of the ethylene-type resin and at or below 150° C. is preferably used, and by using such a free-radical-producing agent one can carry out the aforementioned chemical bonding reaction quickly.

As concrete examples of said free-radical-producing agent may be mentioned, for example, organic peroxides such as benzoyl peroxide, lauryl peroxide, etc., and organic peresters such as t-butyl-peracetate, t-butyl-peroxy-2-ethyl-hexanoate, t-butyl-peroxy-isobutylate, etc.

As far as the amount thereof to be used is concerned, it can be suitably determined depending upon the kind of ethylene-type resin and the amount of alkoxy-silane compound, and so it is difficult to determine unmistakably. However, if too much is used there is danger that trouble will arise at the time of melt-kneading owing to a tendency for independent cross-linking of the ethylene-type resin; on the other hand, if too little is used it will become difficult to carry out the bonding reaction between the ethylene-type resin and the alkoxy-silane compound to a sufficient degree. Consequently, it is desirable to use 0.01–1.5 parts by weight for each 100 parts by weight of ethylene-type resin.

In accordance with this invention a mixture is made of the aforementioned ethylene-type resin, alkoxy-silane compound and free-radical-producing agent, and this is melt-kneaded, and at the time of this melt-kneading, zinc oxide is added to said mixture and melt-kneaded with it. There is no limitation whatever concerning the time of adding the zinc oxide; it may be added before the commencement of melt-kneading (viz. it may be added to said mixture), or it may also be added after said mixture has been completely melted.

Moreover, there is no limitation whatever regarding the amount of zinc oxide which is included. However, it is desirable that it be 50 parts by weight or less for every 100 parts by weight of ethylene-type resin, and preferably 10 parts by weight or less; and at the same time it is desirable that it be 10–500 parts by weight for every 100 parts by weight of alkoxy-silane compound, and preferably 50–200 parts by weight.

The composition of this invention is as explained above, and the ethylene-type resin which is obtained is silane-modified and zinc oxide remains within the resin. The zinc oxide suppresses the cross-linking reaction of the silane, and so the silane-modified ethylene-type resin which is obtained, like the silane-modified ethylene-type resin of the prior art, results in a resin in which the cross-link density may be changed at will, and has the advantage of having superior properties of heat resistance, atmosphere resistance, chemical resistance, etc.

In addition, there is no lowering of melt index and lowering of moldability due to changes with the passage of time.

Next follows an explanation regarding a working example of this invention. Hereinafter the term "parts" means "parts by weight".

EXAMPLE

| | |
|---|---|
| Low density polyethylene (melt index 4, density 0.927 g/cm$^2$) | 100 parts |
| Vinyl-triethoxy-silane | 1.5 parts |
| 2.5 dimethyl 2.5 di(t-butyl-peroxy)hexane | 0.15 parts |
| Zinc oxide | 1.0 parts |

A mixture having the said composition is supplied to a "supermixer" and after mixing for two minutes it is supplied to a single-shaft (axis) extruder having a barrel-temperature of 200°–240° C. and a nozzle temperature of 180° C. Upon extrusion there is obtained a silane-modified ethylene-type resin sheet of thickness of about 1 mm. The resulting sheets were stored in a constant-temperature chamber (temperature 20° C., humidity 60%) (A) and in the laboratory (May-October) (B). At the fixed time intervals shown in Table 1 the melt index (in conformity with JISK-6760) was measured and used as a criterion of moldability. The results are shown in Table 1.

Comparing these results with the following comparative example, it is seen that the material to which zinc oxide was added has a higher melt index and superior moldability, even after the passage of time, than the material without zinc oxide.

Comparative Example

A composition having the same constitution as the composition in the Example except for the omission of zinc oxide was formed into a silane-modified ethylene-type sheet in the same manner as in the Example, and was stored in a constant-temperature chamber and in the laboratory in the same manner as in the Example, and the melt index was measured. The results are shown in Table 1.

TABLE 1

| | Storage conditions | | | |
|---|---|---|---|---|
| | Example | | Comparative Example | |
| Lapse of time | A | B | A | B |
| Immediately after manufacture | 2.4 | 2.4 | 2.3 | 2.3 |
| 4 days | 2.3 | 2.3 | 1.9 | 1.9 |
| 11 days | 2.2 | — | 1.6 | — |
| 34 days | 1.8 | 1.6 | 1.3 | 1.1 |
| 60 days | 1.7 | — | 1.04 | — |
| 111 days | — | 0.97 | — | 0.44 |
| 140 days | — | 0.95 | — | 0.30 |

(Note:)
A: Constant-temperature chamber; temperature 20° C., humidity 60%
B: Laboratory (May-October)

Having thus described the principles of the invention, together with a preferred embodiment thereof, it is to be understood that, although specific terms are employed, they are used in a generic and descriptive sense, the scope of the invention being set forth in the following claims.

We claim:
1. That method of making silane-modified ethylene-type resin with good moldability which method comprises melt-kneading a mixture consisting essentially of an alkoxy-silane compound having at least one unsaturated radical, 2.5 dimethyl 2.5 di (t-butyl-peroxy) hexane, and an ethylene-type resin selected from the group consisting of low density polyethylene, high density polyethylene, and copolymers having ethylene as a principal component, and including in said mixture an amount of zinc oxide no later than the time during which said mixture is in the molten state during said melt-kneading step.
2. A method according to claim 1, wherein the content of zinc oxide is 50 parts by weight or less for each 100 parts by weight of ethylene-type resin, and at the same time it is 10–500 parts by weight for each 100 parts by weight of alkoxy-silane compound.
3. Silane-modified ethylene-type resin with good moldability comprising a mixture consisting essentially of an alkoxy-silane compound having at least one unsaturated radical, 2.5 dimethyl 2.5 di (t-butyl-peroxy) hexane an ethylene-type resin selected from the group consisting of low density polyethylene, high density polyethylene, and copolymers having ethylene as a principal component, and zinc oxide.
4. Resin according to claim 3, wherein the content of zinc oxide is 50 parts by weight or less for each 100 parts by weight of ethylene-type resin, and at the same time it is 10–500 parts by weight for each 100 parts by weight of alkoxy-silane compound.

* * * * *